US012801391B2

(12) United States Patent
Clancy et al.

(10) Patent No.: US 12,801,391 B2
(45) Date of Patent: Nov. 17, 2026

(54) VALUE PREDICTION

(71) Applicant: Arm Limited, Cambridge (GB)

(72) Inventors: Robert Douglas Clancy, Apex, NC (US); Alexander Cole Shulyak, Austin, TX (US); Zachary Allen Kingsbury, Austin, TX (US)

(73) Assignee: Arm Limited, Cambridge (GB)

( * ) Notice: Subject to any disclaimer, the term of this patent is extended or adjusted under 35 U.S.C. 154(b) by 94 days.

(21) Appl. No.: 19/043,655

(22) Filed: Feb. 3, 2025

(65) Prior Publication Data

US 2026/0228009 A1 Aug. 6, 2026

(51) Int. Cl.
*G06F 9/38* (2018.01)
*G06F 9/30* (2018.01)

(52) U.S. Cl.
CPC ........ *G06F 9/3836* (2013.01); *G06F 9/30058* (2013.01)

(58) Field of Classification Search
None
See application file for complete search history.

(56) References Cited

U.S. PATENT DOCUMENTS

2023/0138987 A1* 5/2023 Bo ......................... G06N 20/00 706/12

* cited by examiner

*Primary Examiner* — Scott C Sun
(74) *Attorney, Agent, or Firm* — NIXON & VANDERHYE P.C.

(57) ABSTRACT

An apparatus comprises value prediction storage providing value prediction entries, each providing a data value prediction associated with a corresponding instruction. Allocation circuitry is provided to control allocation of value prediction entries in the value prediction storage using a value prediction allocation filter comprising a plurality of allocation filter entries, each providing a counter value. The allocation circuitry identifies a target allocation filter entry based on an identifier of a given instruction and an observed data value outcome of the given instruction, and suppresses allocation of a value prediction entry corresponding to the given instruction in the value prediction storage when a target counter value in the target allocation filter entry does not meet an allocation threshold.

20 Claims, 7 Drawing Sheets

VALUE PREDICTION

BACKGROUND

Technical Field

The present technique relates to the field of data processing.

Technical Background

A processing apparatus may have value prediction circuitry for generating a data value prediction indicating a predicted result data value for a given instruction before the actual result data value of the given instruction is available. This can help other instructions dependent on the predicted instruction execute earlier based on the predicted result data value, which can improve performance if the data value prediction is correct. For example, a load instruction which retrieves a data value from a storage location in memory may be "in flight" for many processing cycles. Another instruction which follows the load instruction and makes use of that data value as a source value will therefore be held up until the load operation completes. Value prediction enables the data processing apparatus to progress the execution of such dependent instructions, working on the assumption that a predicted value will be correct. The penalty of correcting occasional errors in the predictions (by re-running instruction execution from the point at which the incorrect predicted value was used) can be outweighed by the performance benefit of avoiding the above-mentioned hold ups for dependent instructions.

SUMMARY

At least some examples of the present technique provide an apparatus, comprising value prediction storage comprising a plurality of value prediction entries, each value prediction entry providing a data value prediction associated with a corresponding instruction;

a value prediction allocation filter comprising a plurality of allocation filter entries, each allocation filter entry providing a counter value; and allocation circuitry configured to control allocation of value prediction entries in the value prediction storage; wherein the allocation circuitry is configured to identify a target allocation filter entry based on an identifier of a given instruction and an observed data value outcome of the given instruction; and the allocation circuitry is configured to suppress allocation of a value prediction entry corresponding to the given instruction in the value prediction storage in response to a determination that a target counter value in the target allocation filter entry does not meet an allocation threshold.

At least some examples of the present technique provide a system comprising:

the apparatus described above, implemented in at least one packaged chip;

at least one system component; and a board, wherein the at least one packaged chip and the at least one system component are assembled on the board.

At least some examples of the present technique provide a chip-containing product comprising the system described above, wherein the system is assembled on a further board with at least one other product component.

At least some examples provide a method, comprising storing a plurality of value prediction entries in value prediction storage, each value prediction entry providing a data value prediction associated with a corresponding instruction;

providing a value prediction allocation filter comprising a plurality of allocation filter entries, each allocation filter entry providing a counter value;

controlling allocation of value prediction entries in the value prediction storage;

identifying a target allocation filter entry based on an identifier of a given instruction and an observed data value outcome of the given instruction; and suppressing allocation of a value prediction entry corresponding to the given instruction in the value prediction storage in response to a determination that a target counter value in the target allocation filter entry does not meet an allocation threshold.

At least some examples provide computer-readable code for fabrication of an apparatus comprising:

value prediction storage comprising a plurality of value prediction entries, each value prediction entry providing a data value prediction associated with a corresponding instruction;

a value prediction allocation filter comprising a plurality of allocation filter entries, each allocation filter entry providing a counter value; and allocation circuitry configured to control allocation of value prediction entries in the value prediction storage; wherein the allocation circuitry is configured to identify a target allocation filter entry based on an identifier of a given instruction and an observed data value outcome of the given instruction; and the allocation circuitry is configured to suppress allocation of a value prediction entry corresponding to the given instruction in the value prediction storage in response to a determination that a target counter value in the target allocation filter entry does not meet an allocation threshold.

The computer-readable code may be stored on a computer-readable storage medium. The storage medium may be non-transitory.

Further aspects, features and advantages of the present technique will be apparent from the following description of examples, which is to be read in conjunction with the accompanying drawings.

DESCRIPTION OF EXAMPLES

Figure 1:
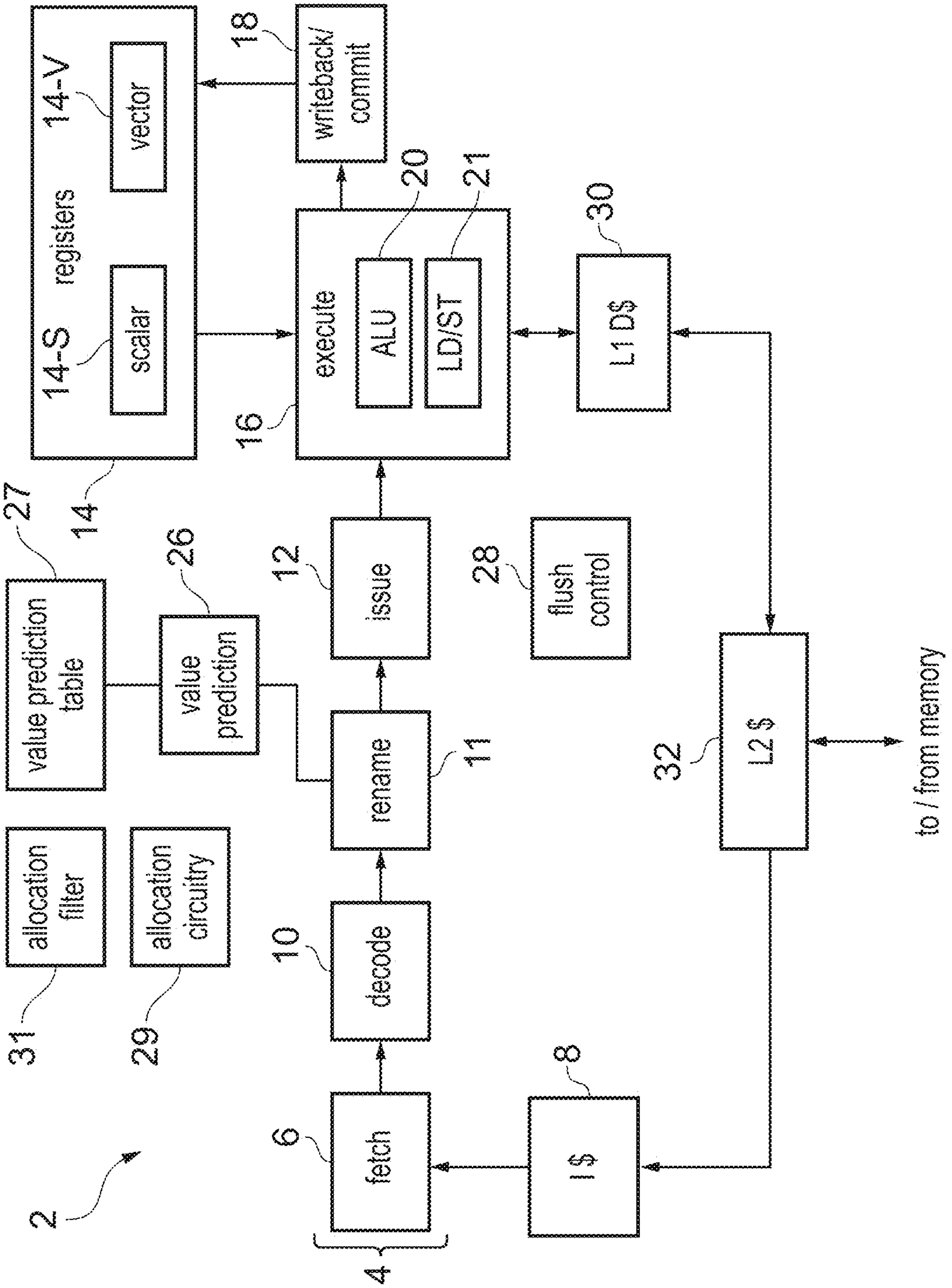
FIG. 1 illustrates an example of an apparatus comprising value prediction circuitry.

An apparatus has value prediction storage comprising a plurality of value prediction entries. Each value prediction entry provides a data value prediction associated with a corresponding instruction. The data value prediction may for example comprise a previously observed data value outcome of the corresponding instruction (e.g., a value previously loaded by a particular load instruction). In some examples, value prediction entries may be associated with a particular instance of a corresponding instruction, and hence several value prediction entries may be provided for different instances of an instruction at a particular memory address.

Providing value prediction storage can enable data value predictions to be made for instructions in a program. For example, the value prediction storage can be looked up based on information identifying an instruction in the program (e.g., a load instruction to load a data value from a location in memory) and if a corresponding value prediction entry is identified in the value prediction storage, then the data value prediction provided by that value prediction entry can be used as a predicted outcome of the instruction for executing subsequent instructions (e.g., instructions making use of a value loaded by a load instruction can use the predicted load value rather than waiting for the true load value to be returned from memory). This can improve performance by breaking dependency chains between instructions, allowing later dependent instructions to be executed before the correct outcome of an earlier instruction is known. Predicted values of instructions can be confirmed later to guarantee correct execution (with execution being rewound if the prediction was incorrect).

The given instruction whose result data value is predicted could be any instruction which generates a value for a given destination register which can be referenced as a source operand by a dependent instruction. For example, the given instruction could be an arithmetic/logical instruction for which the processing circuitry performs an arithmetic/logical operation to generate the result data value. The given instruction could also be a load instruction which causes the processing circuitry to issue a load request to a cache or memory system to cause the result data value to be loaded to a given destination register.

The value prediction storage may enable observed value outcomes of instructions to be tracked over time, with predictions being made in some examples only when a particular outcome has been observed enough times to have a high confidence that the prediction is correct.

Value prediction suffers from the fundamental problem that a large number of instructions do not exhibit stable results which can be predicted using the value prediction storage. Many instructions may have a data outcome which changes over time (e.g., the value loaded by a load instruction may change throughout a program), and therefore for many instructions a previously observed data value recorded in the value prediction storage may not provide a good prediction. In some implementations, only around 10-30% of instructions may have a behaviour which is stable enough to be predicted using the value prediction storage.

The value prediction storage has a finite size and, to meet area and power requirements, the size of the value prediction storage may be limited such that all possible value prediction entries cannot be stored in the value prediction storage. When allocating new value prediction entries, previous value prediction entries may therefore need to be invalidated. However, a large number of newly allocated value prediction entries may be associated with unstable instructions (for which data value predictions cannot be made, as discussed above) and therefore the value prediction storage may undergo significant thrashing whereby potentially useful value prediction entries are evicted to make space for value prediction entries having a high likelihood of not being useful. Such thrashing limits the efficiency and coverage of the value prediction storage, and the process of continuously replacing value prediction entries can also be associated with a high power cost.

According to examples of the present techniques, the apparatus comprises a value prediction allocation filter, and allocation circuitry configured to control allocation of value prediction entries in the value prediction storage in dependence on the value prediction allocation filter.

The value prediction allocation filter comprises a plurality of allocation filter entries, each allocation filter entry providing a counter value. The allocation circuitry is configured to identify a target allocation filter entry based on an identifier of a given instruction (e.g., based on the memory address of the instruction) and an observed data value outcome of the given instruction, and suppress allocation of a value prediction entry corresponding to the given instruction in the value prediction storage in response to a determination that a target counter value in the target allocation filter entry does not meet an allocation threshold.

The target counter value is associated with the particular combination of an identifier of the given instruction (e.g., based on the memory address of the instruction) and a particular observed data value outcome, and may for example represent a number of times the given instruction has been seen with the same observed data value outcome. By suppressing allocation of a value prediction entry in the value prediction storage until the given instruction has been seen a certain number of times with the same observed data value outcome, this can reduce the likelihood of value prediction entries being allocated in the value prediction storage for instructions having a data value outcome which changes over time, as for these instructions it is less likely that a particular instruction would be observed with the same data value outcome a number of times. The value prediction allocation filter can therefore reduce the likelihood that unstable instructions, having data value outcomes which are liable to change and therefore difficult to predict, are allocated in the value prediction storage.

Suppressing allocation of the value prediction entry may be implemented in various ways. In some examples, a decision about whether or not to allocate a value prediction entry corresponding to a given instruction may be made in response to observing a data value outcome of the given instruction, and in such examples suppressing the allocation may comprise deciding to not allocate the value prediction entry in response to the observed instance of the given instruction. A future decision about whether or not to allocate a value prediction entry corresponding to the given instruction may depend on the target counter value at that future time, and hence future allocation of the value prediction entry may not be suppressed even if allocation has been previously suppressed.

Use of the value prediction allocation filter can reduce the problems discussed above. In particular, by reducing allocation of less useful value prediction entries, this can increase a proportion of useful value prediction entries in the value prediction storage, meaning that there is a higher likelihood of the value prediction storage containing a value prediction entry for an instruction which can be predicted.

This can therefore increase coverage of the value predictor, where coverage may be defined as a proportion of potentially predictable instructions which are successfully predicted. Use of the value prediction allocation filter can also reduce power utilisation of the value prediction storage by reducing a number of evictions and allocations of value prediction entries in the value prediction storage.

It might be assumed that filtering allocations into the value prediction storage, and therefore reducing allocation of value prediction entries, would be associated with reduced coverage for a value predictor. However, the inventors have realised that due to the low proportion of instructions which may be predicted, allocation into the value prediction storage without filtering may reduce a proportion of useful entries in the value prediction storage. Therefore, the inventors have realised that providing the value prediction allocation filter may be counter-intuitively associated with increased value prediction coverage.

As mentioned above, the counters provided by entries of the value prediction allocation filter may represent a number of times the given instruction has been seen with the same observed data value outcome. This may be implemented in various ways. In some examples, the counter provided by an allocation filter entry may be updated when the allocation filter is accessed. For example, if the allocation filter is looked up in response to observed outcomes of instructions, then a number of times the value prediction allocation filter has been looked up for a particular instruction and outcome may be reflective of a number of times that instruction has been observed with that outcome. Therefore, in some examples, in response to the determination that the target counter value in the target allocation filter entry does not meet the allocation threshold, the allocation circuitry may be configured to increment the target counter value with a given probability. Hence, a particular combination of a given instruction and observed outcome for that instruction may be used to look up the value prediction allocation filter, and if the counter value of the identified allocation filter entry does not meet an allocation threshold the allocation circuitry may not allocate a value prediction entry for the given instruction, and also increment the counter value with a given probability. At a certain point, when the allocation filter has been looked up for the same combination of a given instruction and observed outcome a certain number of times, the counter value will reach the threshold value and the allocation circuitry will not suppress the allocation of the value prediction entry for the given instruction.

In some examples, the given probability may be one. That is, the counter value of an allocation filter entry may be updated every time a lookup in the value prediction allocation filter hits against that allocation filter entry. This approach may provide the most predictable increase of the counter values.

However, in other examples the given probability may be less than one. When a lookup in the value prediction allocation filter identifies an entry having a counter value less than the allocation threshold, the allocation circuitry may stochastically update the counter value with a predetermined probability which permits the counter value to either be updated or not updated. The probability is not particularly limited, but in one relatively simple example could be 0.5. This could be implemented in various ways, for example based on the value of a predetermined bit of a linear-feedback shift register (LFSR) updated for each lookup. Stochastically updating a counter value has the advantage that smaller counter values may be provided for a given desired level of filtering. For example, a predictably updated counter having an allocation threshold of 8 could be approximated by a stochastically updated counter having an allocation threshold of 4 and an update probability of 0.5. On average, both counters allow allocation after the same number (8) of occurrences of a given instruction and outcome combination, but the stochastic counter may be provided with fewer bits of storage (in this example, 2 bits rather than 3 bits) which can be associated with significant area and power savings for the value prediction allocation filter.

In some examples, the allocation circuitry may be responsive to a determination that the target counter value in the target allocation filter entry meets the allocation threshold to allocate a new value prediction entry corresponding to the given instruction in the value prediction storage. If required, the allocation circuitry may evict a previous entry of the value prediction storage to accommodate the new value prediction entry. As discussed above, the target count value may represent a number of times the particular instruction and outcome combination has been seen. If this meets the threshold then this indicates that the same instruction has been seen to have the same outcome a threshold number of times, and the instruction is therefore more likely to be an instruction having a repeated data value outcome. Therefore, there may be a higher likelihood that a value prediction entry for the combination of the given instruction and the observed outcome would be useful for making future predictions, justifying allocation of the entry in the value prediction storage.

In some examples, the allocation circuitry may be responsive to a determination that the target counter value in the target allocation filter entry meets the allocation threshold to reset the target counter value. Once a particular combination of an instruction and observed outcome have been allocated to the value prediction storage, there may no longer be a requirement to retain the counter value in the value prediction allocation filter. For example, the allocation circuitry may be configured to look up the allocation filter in response to determining that the combination of the particular instance of the given instruction and the observed outcome are not in the value prediction storage. Therefore, there may be no benefit to retaining the target counter value after the new value prediction entry has been allocated, and resetting the target counter value may therefore support use of the target allocation filter entry for tracking occurrences of a different instruction.

The counter could be reset in various ways. In some examples, the target counter value may be a non-saturating counter value having a maximum value equal to the allocation threshold, and the allocation circuitry may be configured to increment the target counter to reset the target counter value. A non-saturating counter is one for which an increment from the maximum value causes the value to wrap around to its minimum value. For example, a 2-bit non-saturating counter having the maximum value 11 (e.g., representing 3) would be incremented to 00 (representing 0). Configuring the allocation circuitry to increment the counter when the counter has the threshold value may provide a particularly convenient approach for resetting the counter values of the allocation filter. By having a maximum value equal to the allocation threshold, all states of the counters are used and hence the size of the allocation filter is minimised for a given level of granularity.

The allocation circuitry may use various approaches to identify a particular allocation filter entry for a given instruction and observed data value outcome. In some examples, entries of the allocation filter may be tagged with information identifying a particular instruction (e.g., the memory address of the instruction) and particular data value outcome, wherein each entry may only be associated with a given instruction and outcome combination. However, in some examples, the allocation circuitry may be configured to perform a hash function taking a memory address of the given instruction and the observed data value outcome of the given instruction as inputs to obtain a hash value identifying the target allocation filter entry. The hash value could be used to index into the value prediction allocation filter, for example.

Accessing the allocation filter using a hash function means that allocation filter entries do not need to be explicitly associated with a particular instruction, and do not need to provide tag values, reducing the overhead of managing the allocation filter.

The hash function may be defined such that the same hash value identifying the same allocation filter entry may be obtained by performing the hash function taking different instructions as inputs. That is, different instructions may alias onto the same allocation filter entry. This can allow use of an allocation filter having fewer entries than a current number of instructions being subjected to filtering. In practice, there may be a large number of candidate instructions for the value prediction storage, and each instruction may be associated with various observed data value outcomes (in different instances), such that if the allocation filter were to provide a dedicated entry for each combination of an instruction and an observed outcome, the total number of entries in the allocation filter would have the potential to be impractically large. Providing a hash function as described allows each entry to be associated with a number of combinations of instruction and observed outcome, which can reduce the overall size of the allocation filter.

In this way, the value prediction allocation filter is provided in a manner similar to a bloom filter with a single hash function, providing a counter value at each filter position (which may be more general than a single bit of a typical bloom filter). Due to the possibility for multiple instruction/outcome combinations to map onto the same entry, there is a chance that a given combination observed less than the threshold number of times may pass the filter if other instructions also incremented the counter of the identified allocation filter entry (i.e., the filter may permit false positives), but in general an instruction observed the threshold number of times should cause the same target entry to be incremented the threshold number of times and hence should pass the filter without being incorrectly suppressed from allocation in the value prediction storage (i.e., the filter does not permit false negatives).

The hash function is not particularly limited. The hash function may be configured such that the same instruction executed in a given way and having the same outcome should map onto the same allocation filter entry. In some examples, bits of the instruction memory address and the observed data value outcome could be combined (e.g., using an exclusive or (XOR) function) to provide an N-bit hash value for indexing into an allocation filter having 2^N allocation filter entries. In some examples, the hash function may be configured to produce outputs across the whole range of possible hash values (ideally evenly distributed) to distribute lookups across the whole allocation filter and reduce the likelihood of aliasing.

In some examples, the plurality of allocation filter entries may provide a single bit counter value. For example, a given allocation filter entry may be initialised with the counter in a first state (e.g., 0), and only permit allocation when the counter has a second state (e.g., 1—the allocation threshold). The counter value may be incremented (e.g., from 0 to 1) in response to a first instance of a particular combination of an instruction and a data outcome. Therefore, a particular combination of an instruction and outcome may need to be observed at least twice before a value prediction entry may be allocated for that instruction and predicted data value outcome.

In some examples, the plurality of allocation filter entries may provide a multi-bit counter value comprising two or more bits. Providing a multi-bit counter value enables a larger allocation threshold to be used than can be used with a single bit counter value. Increasing a threshold number of times that a particular instruction needs to be seen with a particular outcome before a value prediction entry may be allocated increases the likelihood that value prediction entries allocated to the value prediction storage may be used to generate useful value predictions.

It may be thought that providing a higher allocation threshold may reduce coverage by preventing allocation of value prediction entries which could be useful for making predictions. For example, if the multi-bit counter provides an allocation threshold of 4, it might be thought that this could prevent useful prediction of the instruction, which could have been allocated into the value prediction storage after 1 or 2 repeated occurrences.

However, value prediction may typically require a high degree of prediction accuracy (e.g., in some cases over 99% accuracy) because the cost of a misprediction is very high and so accuracy below that threshold tends to result in performance degradation. This is because if a number of dependent instructions are executed based on mispredicted result data value of the given instruction, then by the time the misprediction is detected, instructions younger than the incorrectly predicted instruction are flushed, refetched and re-executed based on the actual result data value of the given instruction, the delay in successfully committing those instructions is much greater than would have been the case if the data value prediction had never been made and instead the dependent instructions had simply waited for the actual result data value to be obtained for the given instruction. Therefore, in some cases a particular observed data outcome must be seen a reasonably large number of times (in one example, 32 times) for a particular instruction before predictions may be made for that instruction. Therefore, even if a larger allocation threshold is provided, as long as this allocation threshold is still reasonably low with respect to the number of times a particular result must be seen before predictions can be made, then pollution in the value prediction storage can be reduced without significantly adversely affecting allocation of value prediction entries which could be used for value prediction. This can result in an overall increase in predictor coverage.

In one particular example, the multi-bit counter value may be a three bit counter value. The allocation threshold may for example be the maximum number of states representable by a three bit counter, which is eight. Hence, the filter prevents allocation of a value prediction entry in the value prediction storage for a particular combination of an instruction and data value outcome until that combination has been seen 8 times. In some examples, predictions can only be made for an instruction when the same result has been seen 32 times, and in such examples an allocation threshold of 8 may not be large enough to significantly impact allocation of entries which would be useful for prediction (as those entries would be expected to easily meet the allocation threshold), whilst preventing allocation of entries corresponding to instructions for which the same result is only seen a handful of times. The inventors have identified that a 3-bit counter value provides a particularly useful compromise between allocation threshold size (in which a larger counter can prevent a greater number of entries from polluting the value prediction storage) and allocation filter size (where larger counters are associated with increased area and power cost). In some examples, an effective allocation threshold of 8 could alternatively be achieved with a 2-bit counter having an allocation threshold of 4, and a stochastic update with a probability of 0.5.

As discussed above, each value prediction entry provides a data value prediction associated with a corresponding instruction. An instruction may be identified at least by the memory address at which the instruction is stored in memory. However, a given instruction may be executed in various different contexts, for which a predicted data value may differ. For example, the same instruction may be accessed via various different routes through a program, and each route might have a different predictable data value outcome for the instruction. Therefore, in some examples, the plurality of value prediction entries associate a given data value prediction with a particular instance of the corresponding instruction identified by some contextual information. The value prediction storage may comprise two or more value prediction entries associated with the same instruction and different contextual information, providing independent data value predictions. Accordingly, the allocation circuitry may be configured to identify a target allocation filter entry based on an identifier of a given instruction (e.g., the memory address of the instruction), the observed data value outcome of the given instruction, and some further contextual information identifying a particular instance of the given instruction.

In one particular example, the allocation circuitry may be configured to identify the target allocation filter entry further based on a branch history indicating branch outcomes of branch instructions executed prior to the given instruction. Branch instructions can cause program flow to jump to different addresses, and may be optionally taken or not taken. A history of recent branch outcomes (i.e., whether the N most recent branches were taken or not taken) therefore identifies a particular path which has been taken through a program to reach the given instruction, and can be used to distinguish different instances of an instruction. As the outcomes may be different (but in some cases nevertheless predictable) for different branch histories, value prediction entries may be associated with a branch history. The same instruction with a different branch history may therefore be treated almost as an entirely separate instruction. By looking up the allocation filter using the branch history, this allows different instances of a particular instruction to be treated separately, and in particular can filter allocations of value prediction entries for a particular instruction until the particular instruction has been seen to have a repeated data value outcome when reached in a certain way (i.e., a particular instance of that instruction has been seen to have a repeated outcome).

In some examples, the value prediction storage may comprise a plurality of value prediction tables, where value prediction entries in at least a subset of the plurality of value prediction tables are associated with a combination of the corresponding instruction and a corresponding branch history, and two or more value prediction tables comprise value prediction entries associated with different lengths of branch history. Such an arrangement may be present in a tagged geometric (TAGE) value predictor comprising a plurality of TAGE tables. When a lookup hits in any of the TAGE tables, a prediction may be generated from the entry looked up using the longest length of branch history information. That is, a TAGE predictor may preferentially select a value prediction based on an entry hit in a table indexed based on a longer history information, but if no hit is identified in the longer history tables then a prediction from a table indexed based on a shorter length of history can be used instead. This approach can provide high performance because TAGE predictors can remove the need to compromise between shorter history (which is more likely to hit against an entry but for which the prediction is less accurate) and longer history (which is less likely to hit against an entry but if it does then the prediction is more accurate) as both short and long history can be used to look up different tables.

The plurality of TAGE tables could each be provided with a separate value prediction allocation filter, which could be looked up using the relevant length of branch history used to look up the corresponding TAGE table. However, the inventors have realised that in practice, a shared allocation filter can be used to filter allocations into each of the separate TAGE tables. With a shared allocation filter, the allocation circuitry determining whether to suppress allocation into a given TAGE table may look up the shared allocation filter (e.g., by calculating a hash function and indexing using the hash value) using a length of branch history relevant to the given TAGE table, and when determining whether to suppress allocation into a different TAGE table may use a different length of branch history. The inventors have determined that despite being used for several different tables and branch lengths, and therefore being used for a large number of different lookups, a shared value prediction allocation filter has been found to be effective in reducing pollution for a plurality of TAGE tables. Therefore, in some examples, the allocation circuitry may be configured to identify the target allocation filter entry in a shared value prediction allocation filter to determine whether to allocate a value prediction entry in a given value prediction table of the two or more value prediction tables, wherein the target allocation filter entry is identified using a length of branch history selected in dependence on the given value prediction table. Use of a shared value prediction allocation filter has the advantage of significantly reducing a storage requirement for the allocation filter compared to provision of separate allocation filters for different tables.

As discussed above, in some examples lookups for multiple different instructions may access the same allocation filter entry. Over time the counter values provided by the allocation filter may gradually be incremented (even by individual occurrences of certain instruction and outcome combinations) and reduce the effectiveness of the allocation filter, allowing value prediction entries to be allocated for instructions which have not actually been observed the allocation threshold number of times. Therefore, in some examples, the allocation circuitry may be configured to decrement counter values provided by one or more allocation filter entries in response to a decrement trigger. Counter values may be decremented in various ways. For example, counter values may be decremented by a certain decrement value or could be reset altogether. A selection of which counter values to decrement is also not particularly limited, and in some examples all counter values may be decremented while in other examples a subset (e.g., a randomly selected subset) could be decremented. By decrementing counter values, this retains the usefulness of the allocation filter by clearing out the counter increments which would otherwise pollute the allocation filter. It will be appreciated that the rate of decrementing the counter values may be less than the rate at which a typical instruction would increment the counter values, and therefore decrementing the counters would not prevent an entry accessed in response to a potentially predictable instruction from reaching the allocation threshold.

The decrement trigger is not particularly limited. The decrement trigger could for example happen at timed intervals, such as at regular intervals. The rate at which count values are incremented is associated with a number of lookups in the value prediction allocation filter, which is a function of the number of executed instructions of a type which may be subject to value prediction. Therefore, in some examples, the decrement trigger may comprise a determination that at least one type of instruction has been executed a given number of times since a previous decrement trigger, where the at least one type of instruction may comprise instructions which may be subject to value prediction (such as load instructions).

As discussed above, the value prediction storage may be used by value prediction circuitry to predict outcomes of instructions. In some examples, the apparatus therefore comprises value prediction circuitry responsive to a target instruction to perform a lookup in the value prediction storage, wherein each value prediction entry provides a confidence indication associated with the data value prediction, and in response to identifying a matching value prediction entry corresponding to the target instruction for which the confidence indication exceeds a prediction threshold, the value prediction circuitry is configured to provide the data value prediction of the matching value prediction entry as a predicted outcome of the target instruction.

The number of allocation filter entries in the value prediction allocation filter is not particularly limited. A larger number of entries may reduce the likelihood of aliasing (whereby lookups for different instructions identify the same allocation filter entry), at the cost of increased storage. In general, a number of allocation filter entries may be smaller than a possible number of instruction and outcome combinations which could be tracked in the allocation filter.

Specific examples will now be described with reference to the drawings.

FIG. 1 schematically illustrates an example of a data processing apparatus 2. The data processing apparatus has a processing pipeline 4 which includes a number of pipeline stages. In this example, the pipeline stages include:

- a fetch stage 6 for fetching instructions from an instruction cache 8.
- a decode stage 10 for decoding the fetched program instructions to generate micro-operations (decoded instructions) to be processed by remaining stages of the pipeline.
- a rename stage 11 for performing register renaming to map logical register identifiers specified by program instructions or micro-operations to physical register identifiers identifying physical registers in a register file 14.
- an issue stage 12 for checking whether operands required for the micro-operations are available in the register file 14 and issuing micro-operations for execution once the required operands for a given micro-operation are available (or are guaranteed to be available by the time the micro-operation reaches the relevant execution unit).
- an execute stage 16 for executing data processing operations corresponding to the micro-operations, by processing operands read from the register file 14 to generate result values.
- a writeback/commit stage 18 for writing the results of the processing back to the register file 14 and committing instructions once they are guaranteed to be correctly executed.

It will be appreciated that this is merely one example of possible pipeline architecture, and other systems may have additional stages or a different configuration of stages.

The execute stage 16 includes a number of execution units, for executing different classes of processing operation. For example the execution units may include an arithmetic/logic unit (ALU) 20 for performing arithmetic or logical operations on scalar operands read from the registers 14; and a load/store unit 21 for performing load/store operations to access data in a memory system 8, 30, 32. In this example, the memory system includes a level one data cache 30, the level one instruction cache 8, a shared level two cache 32 and main system memory (not shown in FIG. 1). It will be appreciated that this is just one example of a possible memory hierarchy and other arrangements of caches can be provided. Further examples of execution unit (not shown in FIG. 1 for conciseness) can include a branch unit for executing branch instructions, a floating-point unit for performing operations on numbers represented in a floating-point format, etc. The ALU 20 shown in FIG. 1 could be implemented with separate scalar ALU and vector ALU execution units for performing scalar and vector operations, with the scalar ALU processing scalar operands stored in scalar registers 14-S and the vector ALU processing vector operands stored in vector registers 14-V (in some examples the vector registers 14-V and scalar registers 14-S may correspond to separate instances of register files 14).

The specific types of execution unit discussed above for the execute stage 16 are just one example, and other implementations may have a different set of execution units or could include multiple instances of the same type of execution unit so that multiple micro-operations of the same type can be handled in parallel. It is not essential for the apparatus to support both scalar and vector processing (e.g. some examples may not support the vector ALU and vector registers 14-V). It will be appreciated that FIG. 1 is merely a simplified representation of some components of a possible processor pipeline architecture, and the processor may include many other elements not illustrated for conciseness.

The apparatus 2 also includes value prediction circuitry 26 used to generate a data value prediction representing a predicted result data value expected to be obtained by a given instruction, before that instruction has actually been processed by the execute stage 16. For example, an ALU instruction to be processed by the ALU 20 could have the result of the ALU operation (e.g. add, subtract, multiply, divide, square root, shift, AND, OR, etc.) predicted by the value prediction circuitry 26, or the load target data to be loaded by the load/store unit 21 in response to a load instruction could be predicted before the load data is actually returned from the memory system. The value prediction circuitry 26 uses one or more value prediction tables 27 (collectively referred to as value prediction storage) to store prediction information learnt from previous instruction execution that can be used to predict the result data value for an instruction on a subsequent occasion. When a value prediction is made for a given instruction, dependent instructions (instructions which have a source operand which depends directly or indirectly on the result data value of the given instruction) can execute earlier as the dependency on the given instruction can be broken.

Figure 2:
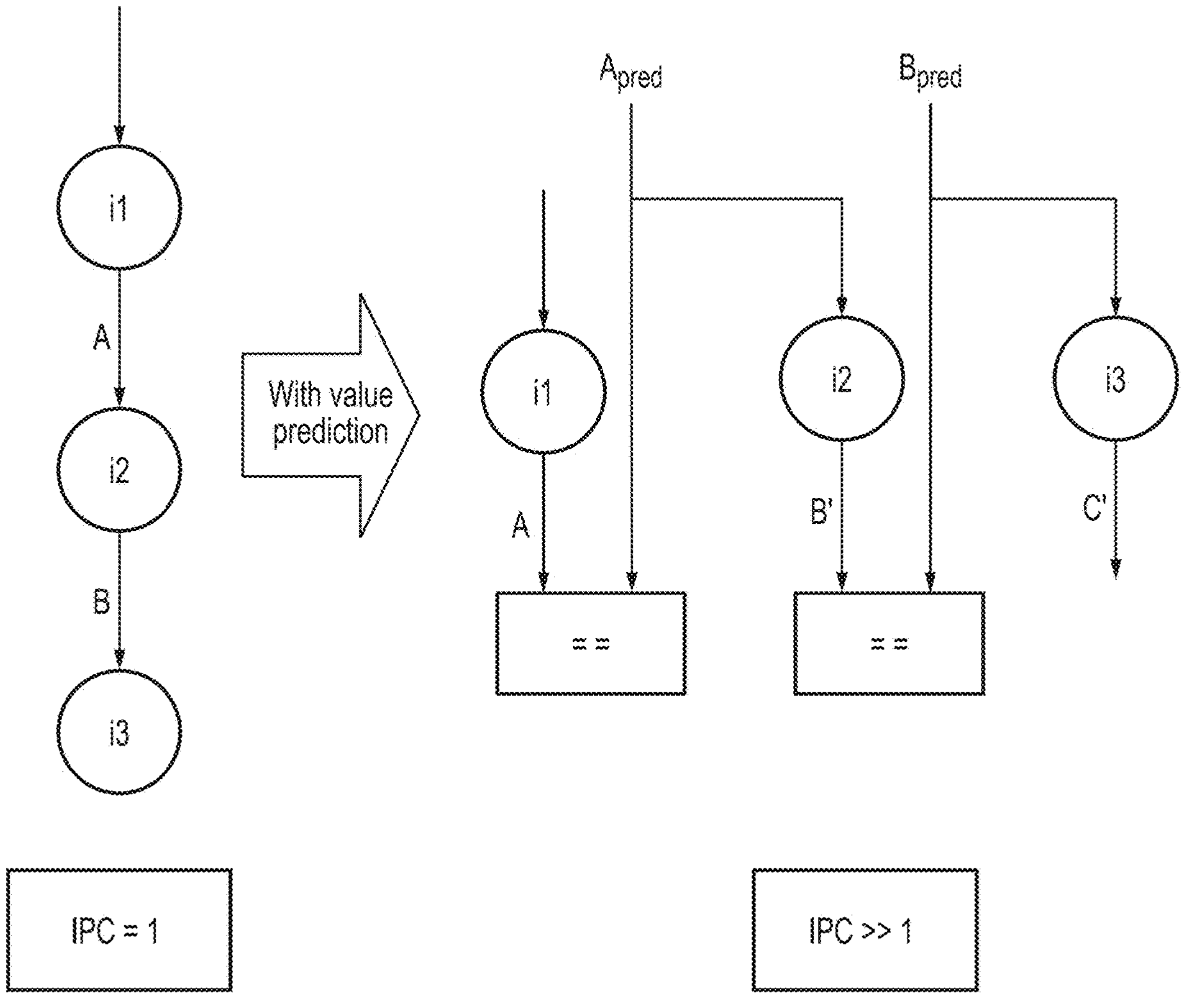
FIG. 2 illustrates how value prediction can increase instruction-level parallelism by breaking dependencies between instructions.

FIG. 2 illustrates the principle of data value prediction. The left-hand part of FIG. 2 illustrates execution of a sequence of instructions in the absence of value prediction, with a second instruction i2 being dependent on the result data value A of a first instruction i1, and a third instruction i3 being dependent on the result data value B of the second instruction i2 (hence, relative to instruction i1, both instructions i2 and i3 are dependent instructions which depend on instruction i1). In the absence of value prediction, the dependencies would constrain these instructions to be executed sequentially, so in the absence of any other independent instructions which could be executed in parallel with the instructions i1-i3, the number of instructions executed per cycle (IPC) would be 1.

The right-hand part of FIG. 2 illustrates how the same instructions i1-i3 can be executed in parallel when value prediction circuitry 26 is used to predict the result data values A and B of instructions i1 and i2. This allows instruction i2 to execute in parallel with instruction i1, based on an operand corresponding to the predicted result data value $A_{pred}$ for instruction i1. Similarly, instruction i3 can execute in parallel with instruction i2, based on an operand corresponding to the predicted result data value $B_{pred}$ for instruction i2. This generates speculative results B' and C' for instructions i2 and i3. Subsequently, once instruction i1 actually completes, comparison logic can compare the actual result data value A of instruction i1 with the predicted result data value $A_{pred}$ for instruction i1, and signal a misprediction if there is a mismatch. Similarly, comparison logic can compare the actual result data value B' of instruction i1 with the predicted result data value $B_{pred}$ for instruction i1, and signal a misprediction if there is a mismatch. If the value predictions are correct, the parallel execution of instructions i1-i3 gives an IPC greater than 1, speeding up performance compared to the execution in absence of value prediction.

As shown in FIG. 1, flush control circuitry 28 is provided to control flushing of instructions and micro-operations from the processing pipeline 4 if a misprediction is detected (either based on an incorrect branch prediction by branch predictor 19, or based on an incorrect value prediction by value prediction circuitry 26). When a flush is required, the flush control circuitry 28 determines the point of program flow associated with the misprediction, and triggers a flush of all instructions/micro-operations younger (later in program order) than the misprediction point, so that those instructions can be re-fetched by the fetch stage 6 and processed once more based on the correct outcome for the mispredicted instruction.

The value prediction table 27 comprises a plurality of value prediction entries. Each value prediction entry is associated with a particular instruction, which may be identified using the memory address of that instruction. For example, entries may be tagged with a portion of the memory address of the associated instruction, which can be used to identify an entry corresponding to a particular instruction. For example, when a program counter (PC) register has a particular PC value indicating the memory address of the next instruction in a program, the PC value can be used to look up the value prediction table to identify which value prediction entry corresponds to the next instruction. Value prediction entries may also be associated with further contextual information for an instruction, which can allow two or more different value prediction entries to be provided for the same instruction when executed in different contexts, as the same instruction may produce different data values depending on the context in which it is executed. For example, as will be discussed in greater detail below, entries may also be identified in dependence on a branch history of recent branch instructions (e.g., an M-bit value with each bit indicating whether a respective one of the most recent M branches was taken or not taken). The value prediction entries also provide the data value prediction itself, and may also provide information indicating a degree of confidence that the value prediction is correct. The confidence indication may for example be incremented when the instruction (in the same execution context) is observed to have the same outcome as indicated in the value prediction entry, and decremented if the instruction is observed to have a different outcome to the outcome recorded in the value prediction entry.

Figure 3:
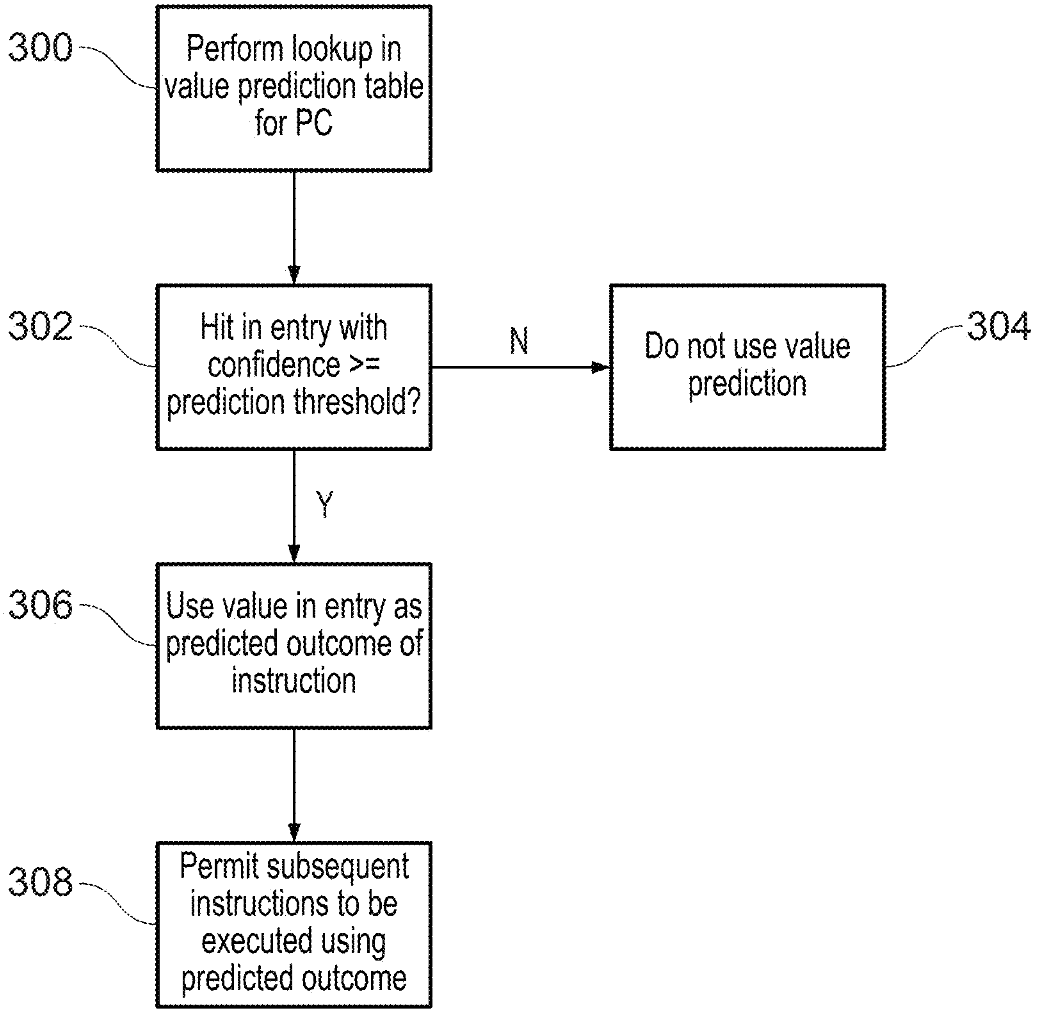
FIG. 3 illustrates a method for data value prediction.

FIG. 3 is a flow diagram illustrating a method of performing data value prediction. At step 300, value prediction circuitry 26 performs a lookup in the value prediction storage 27 based on information identifying a target instruction to be executed by the execute circuitry 16. For example, the value prediction circuitry 26 may use a value of the program counter register to identify a memory address of the target instruction for looking up the value prediction table, and may also use other context information associated with the particular instance of the target instruction (such as a branch history).

At step 302, it is determined whether the value protection storage lookup hits against an entry associated with the target instruction and providing a data value prediction associated with a confidence equal to or higher than a prediction threshold required to make predictions in respect of the target instruction.

If either: a value prediction entry is not identified, or a value prediction entry is identified having a confidence below the prediction threshold, then at step 304 value prediction is not used for the target instruction. Instead, the target instruction is executed as normal and any dependent instructions are delayed (i.e., not issued) until the target instruction has produced an output, and are then executed using the output of the target instruction.

In contrast, if a value prediction entry is identified and provides a data value prediction having a confidence above the prediction threshold, then at step 306 the data value prediction is used as a predicted outcome of the target instruction. Hence, at step 308, any dependent instructions may be issued before the target instruction has been executed, using the predicted outcome of the target instruction as a source operand. In due course, the target instruction is executed (e.g., off the critical path) and the correct outcome of the target instruction is compared against the predicted outcome to determine whether the prediction was correct and hence whether a pipeline flush is required.

As shown in FIG. 1, the apparatus comprises allocation circuitry 29 configured to control allocation of value prediction entries in the value prediction storage 27. In some examples, the allocation circuitry may have a general allocation policy seeking to allocate a value prediction entry in the value prediction storage 27 in response to observing an outcome for a particular instance of an instruction, and determining that the value prediction storage does not currently provide a value prediction entry corresponding to that observed instance of the instruction (e.g. the instruction in the same particular context). However, a significant proportion of instructions (which may be termed unstable instructions) may not have regular data value outcomes, and therefore may not be suitable for value prediction as a previously observed outcome for the instruction may not provide a good prediction for a future instance of the instruction. Allocating entries in the value prediction storage for all observed instructions may risk evicting useful value prediction entries from the value prediction storage in favour of value prediction entries associated with unstable instructions (which can hence not be used for value prediction), and therefore may risk reducing coverage of the value prediction circuitry.

Therefore, in the examples discussed below, the apparatus also comprises at least one value prediction allocation filter 31 to be used by the allocation circuitry 29 when deciding whether to allocate a value prediction entry for a given instance of an instruction in the value prediction storage.

Figure 4:
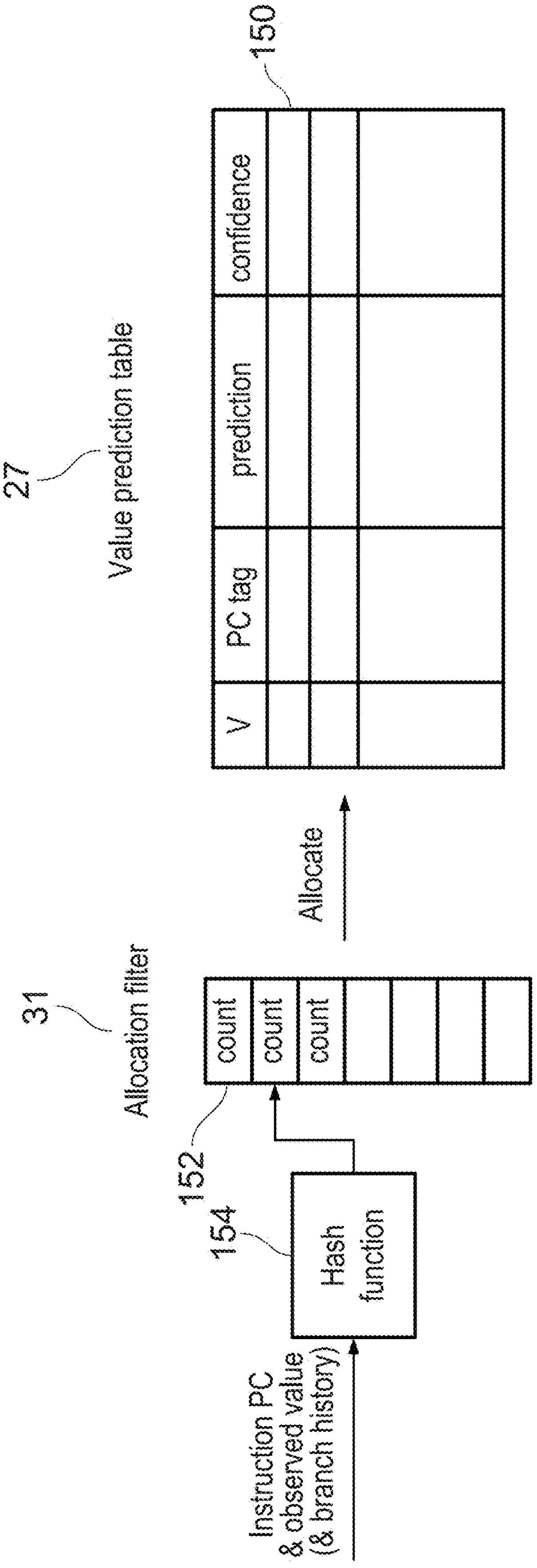
FIG. 4 illustrates value prediction storage and a value prediction allocation filter.

FIG. 4 illustrates the value prediction allocation filter 31 and value prediction storage 27 in greater detail. As mentioned above, the value prediction storage 27 provides a plurality of value prediction entries 150. Each value prediction entry may provide various fields, including a valid field (V) indicating whether the entry is a valid value prediction entry, a memory address tag field (PC tag) providing a tag value used to associate the value prediction entry 150 with a particular instruction at the memory address, a data value prediction field providing a predicted data value outcome of the corresponding instance of the instruction, and a confidence field indicating a level of confidence in the data value prediction being correct. It will be appreciated that although not shown in FIG. 4, there may be other information indicated in the value prediction entries 150, such as contextual information distinguishing different instances of the same instruction (having the same value in the PC tag field).

The allocation filter 31 comprises a plurality of allocation filter entries 152. The number of allocation filter entries 152 may be independent from the number of entries in the value prediction table 27. Each allocation filter entry provides a counter value, which could be as simple as a single bit counter, or could be a multi-bit counter. The counter value provided by an allocation filter entry may represent, for example, a number of times that allocation filter entry has been accessed.

The allocation circuitry uses the allocation filter to reduce a number of value prediction entries allocated for unstable instructions. When deciding whether to allocate a value prediction entry for a particular combination of an instruction and its observed outcome, the allocation circuitry uses the combination of the instruction and outcome to identify an entry in the allocation filter 31. The same entry is identified every time the allocation circuitry sees the same combination of instruction and observed outcome, but if the allocation circuitry sees the instruction with a different outcome then a different entry may be identified. The allocation circuitry determines whether to allocate a value prediction entry 150 for the instruction/outcome combination depending on whether the identified allocation filter entry 152 has a counter value that has reached an allocation threshold. The counter value may be incremented each time the allocation filter entry is accessed, and therefore may represent a number of times the same instruction/outcome combination has been seen. By preventing allocation of a value prediction entry 150 until the allocation filter counter has reached an allocation threshold, this can reduce the number of value prediction entries which are allocated for instructions which have not been seen to have the same outcome a threshold number of times.

The allocation circuitry may use a hash function 154 to obtain a hash value to index into the allocation filter 31 to identify an allocation filter entry. For instance, the allocation circuitry may combine bits of instruction identifying information (such as the instruction address and branch history) and the outcome value to provide N bits for accessing an allocation filter 31 with 2^N entries. The same instruction with different outcomes can therefore provide different hash values to access different allocation filter entries, and would therefore not increment the same counter.

The hash function 154 may allow different instruction/outcome combinations to produce the same hash value and hence access and increment the same allocation filter entry (i.e., alias onto the same entry). Therefore, in some cases the allocation filter may permit allocation of a value prediction entry for a particular instruction/outcome combination without that combination being seen the allocation threshold number of times (if the counter has already been incremented by a different instruction/outcome combination). However, with a sufficiently large allocation filter 31 the likelihood of aliasing can be reduced and in any case the allocation filter permits at least a subset of unnecessary allocations to be blocked. The worst case scenario of permitting every allocation is no worse than the base case where no allocation filter is provided.

Over time, count values of the allocation filter 31 will be incremented by individual occurrences of a particular instruction with a particular outcome, and hence over time the filter will become polluted. The allocation circuitry may therefore support a mechanism for decrementing counters of the filter by, for example, decrementing or clearing counter values at certain intervals. For example, the counter values may be decremented after execution of a certain number of instructions, or after a certain number of lookups of the allocation filter.

Figure 5:
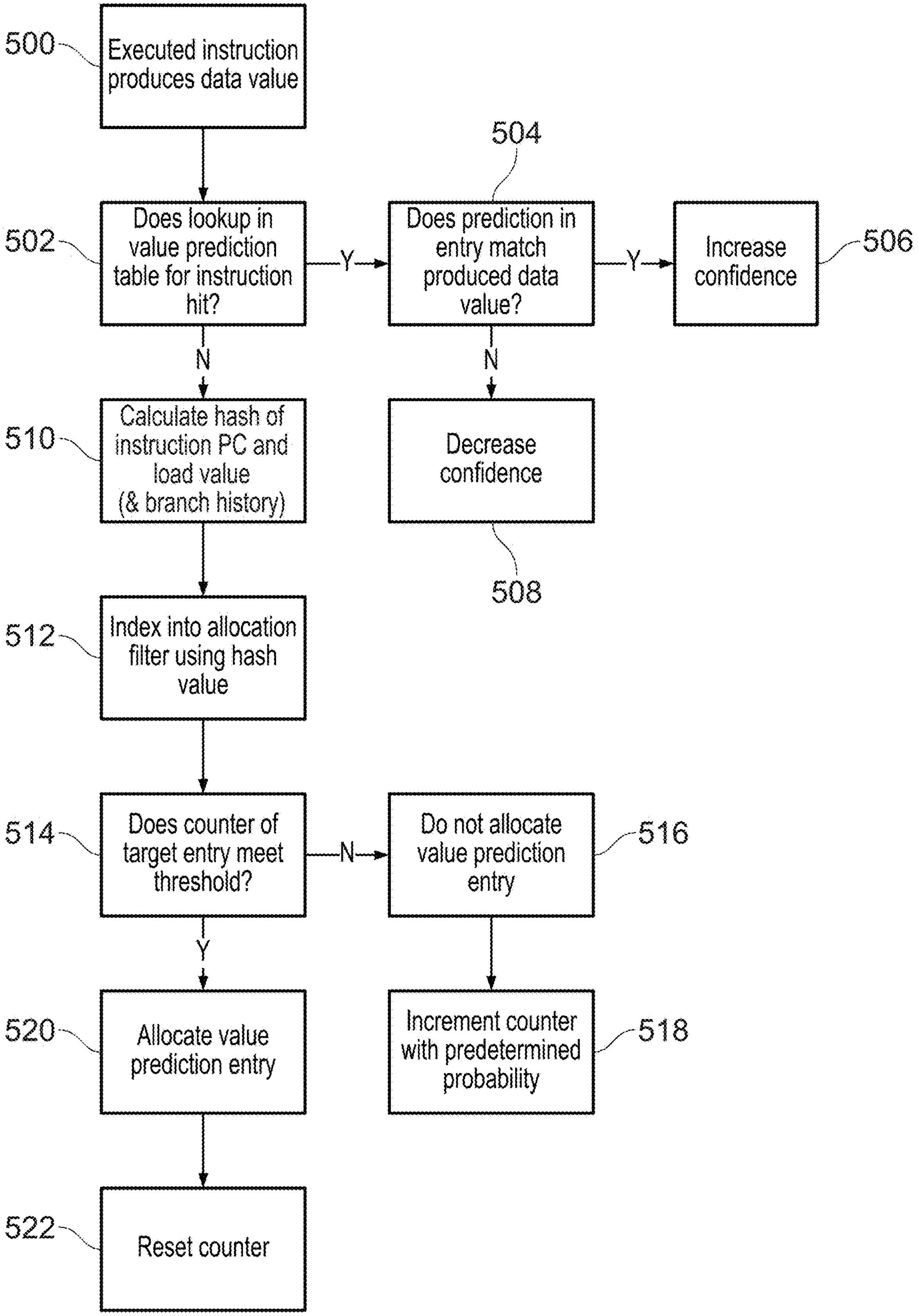
FIG. 5 illustrates a method of controlling allocation of value prediction entries in the value prediction storage.

FIG. 5 is a flow diagram illustrating a method of controlling allocation in the value prediction storage 27 using a value prediction allocation filter 31.

At step 500 an instruction is executed producing a data value outcome. The instruction could for example be a load instruction, and the data value may be the loaded data value returned from memory.

At step 502, the allocation circuitry performs a lookup in the value prediction storage to determine whether there is an existing value prediction entry corresponding to the observed instance of the instruction. If so, then at step 504 it is determined whether the observed outcome matches the data value prediction provided by the existing value prediction entry. If so, then at step 506 the confidence value associated with the data value prediction can be increased by training circuitry responsible for maintaining the confidence values. If the observed data value disagrees with the stored data value prediction, the confidence value can be decreased by the training circuitry at step 508.

If the allocation circuitry did not find an existing value prediction entry in the value prediction storage corresponding to the observed instance of the instruction, then the allocation circuitry is configured to reference the allocation filter to determine whether to allocate a new value prediction entry for the observed instance of the instruction. At step 510 the allocation circuitry may perform a hash function on the memory address of the instruction, the observed data value, and any other relevant context information for the observed instance of the instruction (such as a branch history). The calculated hash value is used to index into the allocation filter at step 512 to identify an allocation filter entry providing a counter value.

At step 514 it is determined whether the counter value meets an allocation threshold. The allocation threshold may for example be the largest numerical value representable using the counter value (e.g., a counter value having all ones).

If the counter value does not meet the allocation threshold, then this indicates that the particular combination of instruction and outcome has not been observed sufficient times to justify allocation of a value prediction entry for that combination (otherwise the counter value would have been higher). Therefore, at step 516 the allocation circuitry suppresses allocation of a new value prediction entry for the observed instance of the instruction, and at step 518 increments the counter value with a predetermined probability. Incrementing the counter value means that a value prediction entry may be allocated in the future for the observed instruction, once the instruction has been observed enough times with the same observed outcome. The probability may be one (i.e., increment for every hit), or may be less than one to support the use of smaller counters whilst maintaining a larger effective allocation threshold.

If the counter value does meet the allocation threshold, then this suggests that the particular combination of instruction and outcome (which was used to identify the entry) has been observed a number of times equal to the allocation threshold, and is therefore a good candidate for allocating to the value prediction storage for training and eventually for predictions to be made once the confidence value is high enough. Therefore, at step 520 the allocation circuitry is configured to allocate a new value prediction entry in the value prediction storage for the observed instance of the instruction, identifying the observed outcome as the data value prediction.

At step 522, after a particular counter value has been used to permit allocation of a value prediction entry in the value prediction storage, the counter value may be reset (e.g., by incrementing the value causing it to wrap around to the minimum value, such as going from all ones to all zeroes). This means that any future instruction/outcome combinations which happen to identify the same entry can be accurately tracked without being affected by increments made for the previous instruction.

Figure 6:
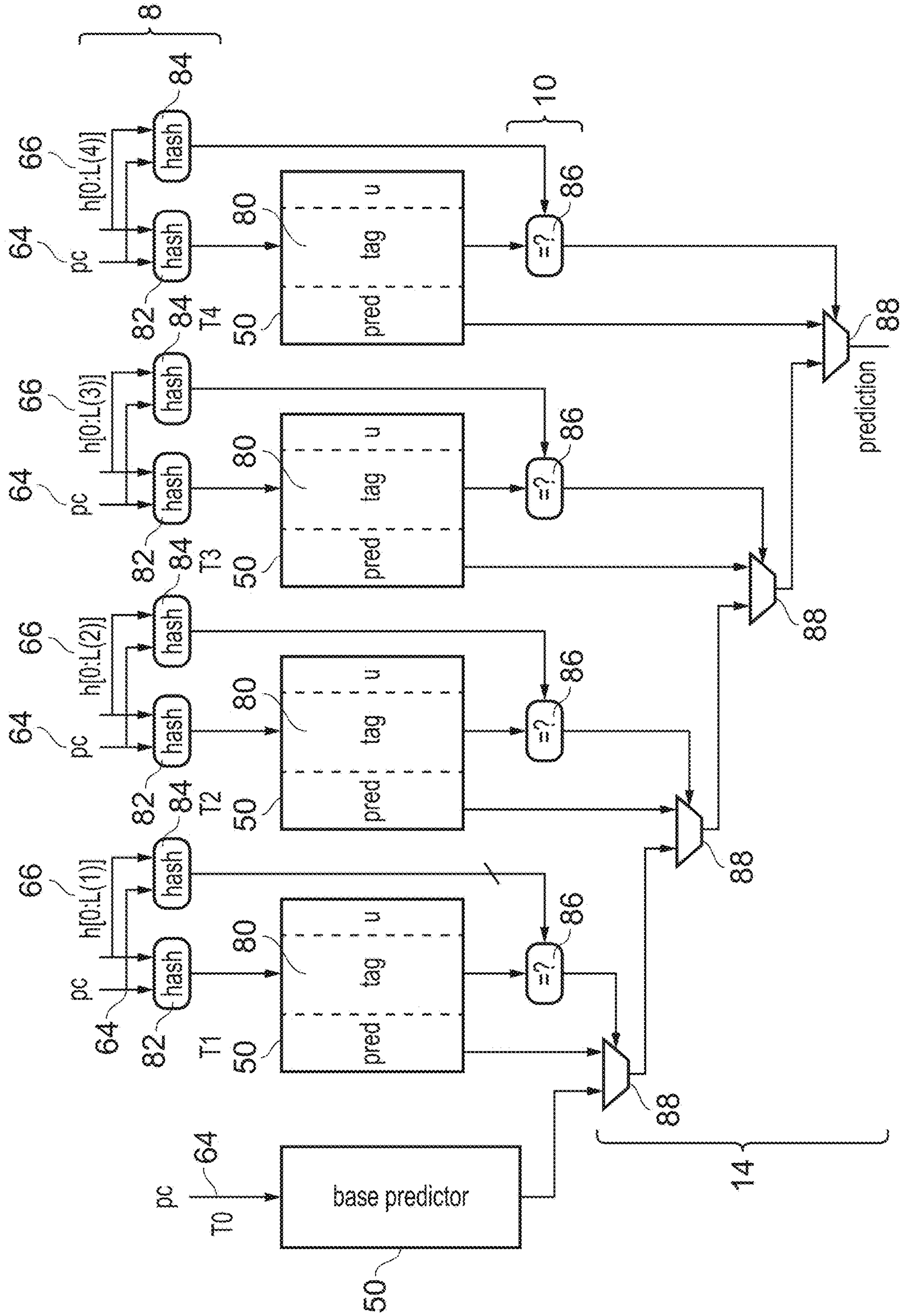
FIG. 6 illustrates a tagged-geometric (TAGE) arrangement of value prediction tables.

FIG. 6 illustrates a further example of value prediction storage 27. In particular, FIG. 6 illustrates a tagged-geometric (TAGE) arrangement of value prediction tables 50. The prediction tables 50 include a base prediction table T0 and a number of tagged-geometric (TAGE) tables T1 to T4. While this example shows 4 TAGE tables for conciseness, it will be appreciated that the TAGE predictors could be provided with a larger number of tables if desired, e.g., 8 or 16. The base predictor T0 is looked up (e.g. indexed/tagged) based on the address of the instruction to be predicted alone, while the TAGE tables T1 to T4 are looked up based on a hash value generated by applying a hash function to the program counter address (PC) 64 and successively increasing lengths of history information 66, so that T1 uses a shorter sequence of history information compared to T2, T2 uses a shorter sequence of history information compared to T3, and so on. In this example T4 is the table which uses the longest sequence of history information. Each table provides a plurality of value prediction entries specifying a predicted data value for a corresponding instruction, in addition to a confidence indication representing a degree of confidence that the data value prediction is correct. Each entry also specifies a tag value 80 which is compared with a tag hash generated from the input lookup information for that table to detect whether the entry corresponds to the current block being looked up (the tag distinguishes between multiple blocks whose index hash values alias onto the same entry of the table). The lookup information generation circuitry 8 includes index hashing circuitry 82 for generating, based on the input lookup information, an index hash for indexing into a selected entry of the table, and tag hashing circuitry 84 for generating, based on the input lookup information, a tag hash value to be written to a newly allocated entry or for comparing with an existing entry's tag value 80 on a lookup, and the lookup circuitry 10 comprises comparison circuitry 86 for comparing the tag value 80 read out from a looked up entry with the calculated tag hash generated by the tag hashing circuitry 84 to determine whether a hit has been detected.

For a TAGE predictor, the value prediction circuitry 26 comprises a cascaded sequence of selection multiplexers 88 which select between the alternative predictions returned by any of the prediction tables 50 which generate a hit. The base predictor 50 may be used as a fall-back predictor in case none of the other TAGE tables generate a hit (a hit occurs when the tag in the looked up entry matches the tag hash generated based on the indexing information). The cascaded multiplexers are such that if the table T4 indexed with the longest sequence of history generates a hit then its prediction will be output as the data value prediction, but if it misses then if the preceding table T3 generates a hit then the T3 prediction will be output as the data value prediction, and so on, so that the prediction which gets selected is the prediction output by the table (among those tables which generated a hit) which corresponds to the longest sequence of history considered in the indexing. That is, any tables which miss are excluded from the selection, and among the remaining tables the one with the longest sequence of history in its indexing information is selected, and if none of the TAGE tables T1 to T4 generate a hit then the base predictor T0 is selected.

This approach is extremely useful for providing high performance because a single table indexed with a fixed length of history has to trade off the accuracy of predictions against the likelihood of lookups hitting in the table. A table indexed with a relatively short sequence of history may be more likely to generate a hit, because it is more likely that the recently seen history leading to the current state is the same as a previously seen sequence of history for which an entry is recorded in the table, but as the shorter sequence of history cannot distinguish as precisely between the different routes by which the program flow may have reached the current state (e.g., it provides a smaller amount of context information for a given instance of the instruction), it is more likely that the prediction indicated in the hit entry may be incorrect. On the other hand, a table which is indexed based on the longest sequence of history (e.g., T4) can be extremely useful for predicting harder to predict instructions which need to delve further into the past in terms of exploring the history so that that the pattern of program execution which led to that instruction can be characterised and an accurate prediction made, however, it is less likely on subsequent occasions that the longer sequence of history will exactly match the sequence of history leading up to the current state and so the hit rate is lower in a table indexed based on a longer sequence of history. By providing a range of tables with different lengths of history used for table lookups, this can balance these factors so that while the hardest predictions can be successfully predicted with the longer table, other easier to predict instructions which do not require the full prediction capability can be predicted using one of the earlier tables indexed based on shorter history so that it is more likely that a hit will be detected on a prediction lookup, thus increasing the percentage of instructions for which a successful prediction can be made and therefore improving prediction accuracy and performance.

In an example employing a plurality of TAGE tables for data value prediction, there are several options for implementing value prediction allocation filtering. In some examples, a separate allocation filter may be provided for each TAGE table. In other examples, a shared allocation filter may be provided for two or more of the TAGE tables. When the allocation circuitry is deciding whether to allocate into a given TAGE table, it may perform a lookup in the shared allocation filter using a hash value calculated by performing a hash function on the memory address, the observed outcome, and a length of branch history selected based on the given TAGE table. For example, if deciding whether to allocate into the table T4, the allocation circuitry may look up the allocation filter using 5 bits of history, whereas when deciding whether to allocate into T1, the allocation circuitry may look up the same allocation filter using only 2 bits of history. In some examples, a shared allocation filter could also be used for two or more tables which are not looked up using a branch history.

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 7:
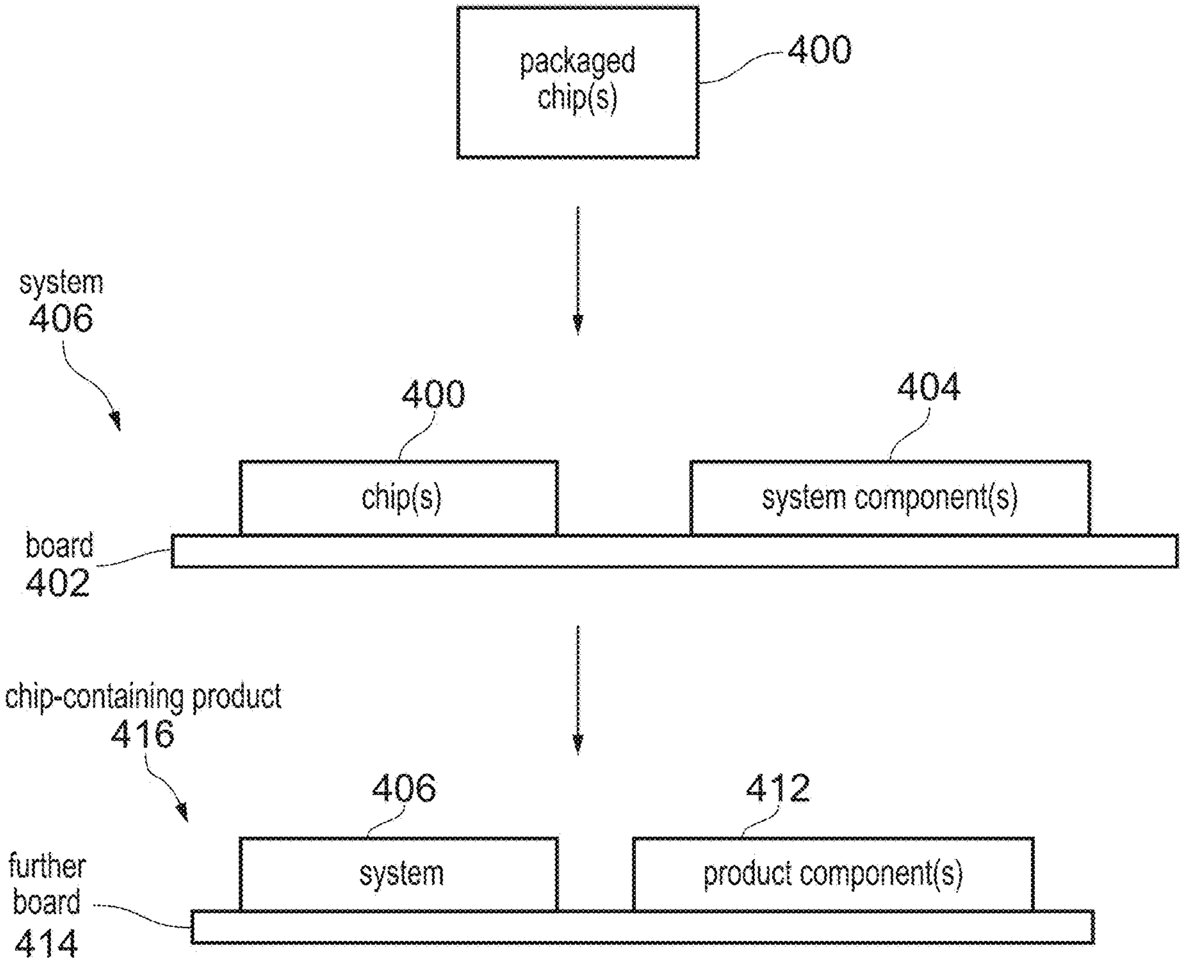
FIG. 7 illustrates a system and a chip-containing product.

As shown in FIG. 7, one or more packaged chips 400, with the apparatus described above implemented on one chip or distributed over two or more of the chips, are manufactured by a semiconductor chip manufacturer. In some examples, the chip product 400 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. modular chips which, when combined, provide the functionality of a chip) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 400 are assembled on a board 402 together with at least one system component 404 to provide a system 406. For example, the board may comprise a printed circuit board. The board substrate may be made of any of a variety of materials, e.g. plastic, glass, ceramic, or a flexible substrate material such as paper, plastic or textile material. The at least one system component 404 comprise one or more external components which are not part of the one or more packaged chip(s) 400. For example, the at least one system component 404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 416 is manufactured comprising the system 406 (including the board 402, the one or more chips 400 and the at least one system component 404) and one or more product components 412. The product components 412 comprise one or more further components which are not part of the system 406. As a non-exhaustive list of examples, the one or more product components 412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 412 may be assembled on to a further board 414.

The board 402 or the further board 414 may be provided on or within a device housing or other structural support (e.g. a frame or blade) to provide a product which can be handled by a user and/or is intended for operational use by a person or company.

The system 406 or the chip-containing product 416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Some examples are set out in the following clauses:

1. An apparatus, comprising
   - value prediction storage comprising a plurality of value prediction entries, each value prediction entry providing a data value prediction associated with a corresponding instruction;
   - a value prediction allocation filter comprising a plurality of allocation filter entries, each allocation filter entry providing a counter value; and
   - allocation circuitry configured to control allocation of value prediction entries in the value prediction storage; wherein
   - the allocation circuitry is configured to identify a target allocation filter entry based on an identifier of a given instruction and an observed data value outcome of the given instruction; and
   - the allocation circuitry is configured to suppress allocation of a value prediction entry corresponding to the given instruction in the value prediction storage in response to a determination that a target counter value in the target allocation filter entry does not meet an allocation threshold.

2. The apparatus according to clause 1, wherein in response to the determination that the target counter value in the target allocation filter entry does not meet the allocation threshold, the allocation circuitry is configured to increment the target counter value with a given probability.

3. The apparatus according to clause 2, wherein the given probability is less than one.

4. The apparatus according to any preceding clause, wherein the allocation circuitry is responsive to a determination that the target counter value in the target allocation filter entry meets the allocation threshold to allocate a new value prediction entry corresponding to the given instruction in the value prediction storage.

5. The apparatus according to any preceding clause, wherein the allocation circuitry is responsive to a determination that the target counter value in the target allocation filter entry meets the allocation threshold to reset the target counter value.

6. The apparatus according to clause 5, wherein the target counter value is a non-saturating counter value having a maximum value equal to the allocation threshold, and the allocation circuitry is configured to incrementing the target counter to reset the target counter value.

7. The apparatus according to any preceding clause, wherein the allocation circuitry is configured to perform a hash function taking a memory address of the given instruction and the observed data value outcome of the given instruction as inputs to obtain a hash value identifying the target allocation filter entry.

8. The apparatus according to clause 7, wherein the hash function is defined such that the same hash value identifying the same allocation filter entry may be obtained by performing the hash function taking different instructions as inputs.

9. The apparatus according to any preceding clause, wherein the plurality of allocation filter entries provide a single bit counter value.

10. The apparatus according to any of clauses 1 to 8, wherein the plurality of allocation filter entries provide a multi-bit counter value.

11. The apparatus according to clause 10, wherein the plurality of allocation filter entries provide a three bit counter value.

12. The apparatus according to any preceding clause, wherein the allocation circuitry is configured to identify the target allocation filter entry based on a branch history indicating branch outcomes of branch instructions executed prior to the given instruction.

13. The apparatus according to clause 12, wherein the value prediction storage comprises a plurality of value prediction tables;
   - value prediction entries in at least a subset of the plurality of value prediction tables are associated with a combination of the corresponding instruction and a corresponding branch history;
   - two or more value prediction tables comprise value prediction entries associated with different lengths of branch history; and
   - the allocation circuitry is configured to identify the target allocation filter entry in a shared value prediction allocation filter to determine whether to allocate a value prediction entry in a given value prediction table of the two or more value prediction tables, wherein the target allocation filter entry is identified using a length of branch history selected in dependence on the given value prediction table.

14. The apparatus according to any preceding clause, wherein the allocation circuitry is configured to decrement counter values provided by one or more allocation filter entries in response to a decrement trigger.

15. The apparatus according to clause 14, wherein the decrement trigger comprises a determination that at least one type of instruction has been executed a given number of times since a previous decrement trigger.

16. The apparatus according to any preceding clause, comprising value prediction circuitry responsive to a target instruction to perform a lookup in the value prediction storage, wherein each value prediction entry provides a confidence indication associated with the data value prediction; and in response to identifying a matching value prediction entry corresponding to the target instruction for which the confidence indication exceeds a prediction threshold, the value prediction circuitry is configured to provide the data value prediction of the matching value prediction entry as a predicted outcome of the target instruction.

17. A system comprising:

the apparatus of any preceding clause, implemented in at least one packaged chip;

at least one system component; and a board, wherein the at least one packaged chip and the at least one system component are assembled on the board.

18. A chip-containing product comprising the system of clause 17, wherein the system is assembled on a further board with at least one other product component.

19. Computer-readable code for fabrication of an apparatus comprising:

value prediction storage comprising a plurality of value prediction entries, each value prediction entry providing a data value prediction associated with a corresponding instruction;

a value prediction allocation filter comprising a plurality of allocation filter entries, each allocation filter entry providing a counter value; and allocation circuitry configured to control allocation of value prediction entries in the value prediction storage; wherein the allocation circuitry is configured to identify a target allocation filter entry based on an identifier of a given instruction and an observed data value outcome of the given instruction; and the allocation circuitry is configured to suppress allocation of a value prediction entry corresponding to the given instruction in the value prediction storage in response to a determination that a target counter value in the target allocation filter entry does not meet an allocation threshold.

20. A method, comprising storing a plurality of value prediction entries in value prediction storage, each value prediction entry providing a data value prediction associated with a corresponding instruction;

providing a value prediction allocation filter comprising a plurality of allocation filter entries, each allocation filter entry providing a counter value;

controlling allocation of value prediction entries in the value prediction storage;

identifying a target allocation filter entry based on an identifier of a given instruction and an observed data value outcome of the given instruction; and suppressing allocation of a value prediction entry corresponding to the given instruction in the value prediction storage in response to a determination that a target counter value in the target allocation filter entry does not meet an allocation threshold.

In summary, an apparatus comprises value prediction storage providing value prediction entries, each providing a data value prediction associated with a corresponding instruction. Allocation circuitry is provided to control allocation of value prediction entries in the value prediction storage using a value prediction allocation filter comprising a plurality of allocation filter entries, each providing a counter value. The allocation circuitry identifies a target allocation filter entry based on an identifier of a given instruction and an observed data value outcome of the given instruction, and suppresses allocation of a value prediction entry corresponding to the given instruction in the value prediction storage when a target counter value in the target allocation filter entry does not meet an allocation threshold.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: A, B and C" encompasses any of the following options: A alone (without B or C), B alone (without A or C), C alone (without A or B), A and B in combination (without C), A and C in combination (without B), B and C in combination (without A), or A, B and C in combination.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus, comprising value prediction storage comprising a plurality of value prediction entries, each value prediction entry providing a data value prediction associated with a corresponding instruction;

a value prediction allocation filter comprising a plurality of allocation filter entries, each allocation filter entry providing a counter value; and allocation circuitry configured to control allocation of value prediction entries in the value prediction storage; wherein the allocation circuitry is configured to identify a target allocation filter entry based on an identifier of a given instruction and an observed data value outcome of the given instruction; and the allocation circuitry is configured to suppress allocation of a value prediction entry corresponding to the given instruction in the value prediction storage in response to a determination that a target counter value in the target allocation filter entry does not meet an allocation threshold.

2. The apparatus according to claim 1, wherein in response to the determination that the target counter value in the target allocation filter entry does not meet the allocation threshold, the allocation circuitry is configured to increment the target counter value with a given probability.

3. The apparatus according to claim 2, wherein the given probability is less than one.

4. The apparatus according to claim 1, wherein the allocation circuitry is responsive to a determination that the target counter value in the target allocation filter entry meets the allocation threshold to allocate a new value prediction entry corresponding to the given instruction in the value prediction storage.

5. The apparatus according to claim 1, wherein the allocation circuitry is responsive to a determination that the target counter value in the target allocation filter entry meets the allocation threshold to reset the target counter value.

6. The apparatus according to claim 5, wherein the target counter value is a non-saturating counter value having a maximum value equal to the allocation threshold, and the allocation circuitry is configured to increment the target counter to reset the target counter value.

7. The apparatus according to claim 1, wherein the allocation circuitry is configured to perform a hash function taking a memory address of the given instruction and the observed data value outcome of the given instruction as inputs to obtain a hash value identifying the target allocation filter entry.

8. The apparatus according to claim 7, wherein the hash function is defined such that the same hash value identifying the same allocation filter entry may be obtained by performing the hash function taking different instructions as inputs.

9. The apparatus according to claim 1, wherein the plurality of allocation filter entries provide a single bit counter value.

10. The apparatus according to claim 1, wherein the plurality of allocation filter entries provide a multi-bit counter value.

11. The apparatus according to claim 10, wherein the plurality of allocation filter entries provide a three bit counter value.

12. The apparatus according to claim 1, wherein the allocation circuitry is configured to identify the target allocation filter entry based on a branch history indicating branch outcomes of branch instructions executed prior to the given instruction.

13. The apparatus according to claim 12, wherein the value prediction storage comprises a plurality of value prediction tables;

value prediction entries in at least a subset of the plurality of value prediction tables are associated with a combination of the corresponding instruction and a corresponding branch history;

two or more value prediction tables comprise value prediction entries associated with different lengths of branch history; and the allocation circuitry is configured to identify the target allocation filter entry in a shared value prediction allocation filter to determine whether to allocate a value prediction entry in a given value prediction table of the two or more value prediction tables, wherein the target allocation filter entry is identified using a length of branch history selected in dependence on the given value prediction table.

14. The apparatus according to claim 1, wherein the allocation circuitry is configured to decrement counter values provided by one or more allocation filter entries in response to a decrement trigger.

15. The apparatus according to claim 14, wherein the decrement trigger comprises a determination that at least one type of instruction has been executed a given number of times since a previous decrement trigger.

16. The apparatus according to claim 1, comprising value prediction circuitry responsive to a target instruction to perform a lookup in the value prediction storage, wherein each value prediction entry provides a confidence indication associated with the data value prediction; and in response to identifying a matching value prediction entry corresponding to the target instruction for which the confidence indication exceeds a prediction threshold, the value prediction circuitry is configured to provide the data value prediction of the matching value prediction entry as a predicted outcome of the target instruction.

17. A system comprising:

the apparatus of claim 1, implemented in at least one packaged chip;

at least one system component; and a board, wherein the at least one packaged chip and the at least one system component are assembled on the board.

18. A chip-containing product comprising the system of claim 17, wherein the system is assembled on a further board with at least one other product component.

19. A non-transitory computer-readable medium storing computer-readable code for fabrication of an apparatus comprising:

value prediction storage comprising a plurality of value prediction entries, each value prediction entry providing a data value prediction associated with a corresponding instruction;

a value prediction allocation filter comprising a plurality of allocation filter entries, each allocation filter entry providing a counter value; and allocation circuitry configured to control allocation of value prediction entries in the value prediction storage; wherein the allocation circuitry is configured to identify a target allocation filter entry based on an identifier of a given instruction and an observed data value outcome of the given instruction; and the allocation circuitry is configured to suppress allocation of a value prediction entry corresponding to the given instruction in the value prediction storage in response to a determination that a target counter value in the target allocation filter entry does not meet an allocation threshold.

20. A method, comprising storing a plurality of value prediction entries in value prediction storage, each value prediction entry providing a data value prediction associated with a corresponding instruction;

providing a value prediction allocation filter comprising a plurality of allocation filter entries, each allocation filter entry providing a counter value;

controlling allocation of value prediction entries in the value prediction storage;

identifying a target allocation filter entry based on an identifier of a given instruction and an observed data value outcome of the given instruction; and suppressing allocation of a value prediction entry corresponding to the given instruction in the value prediction storage in response to a determination that a target counter value in the target allocation filter entry does not meet an allocation threshold.

* * * * *